M. W. FAUBION.
Fertilizer Distributers.

No. 142,454. Patented September 2, 1873.

M. W. FAUBION.
Fertilizer Distributers.

No. 142,454. Patented September 2, 1873.

Witnesses.
C. B. Steele
E. H. Bates

Inventor.
M. W. Faubion,
Chipman Hosmer & Co,
Attorneys,

UNITED STATES PATENT OFFICE.

MATTHIAS WALLS FAUBION, OF PARROTTSVILLE, TENNESSEE.

IMPROVEMENT IN FERTILIZER-DISTRIBUTERS.

Specification forming part of Letters Patent No. 142,454, dated September 2, 1873; application filed December 21, 1872.

*To all whom it may concern:*

Be it known that I, MATTHIAS W. FAUBION, of Parrottsville, in the county of Cocke and State of Tennessee, have invented a new and valuable Improvement in Fertilizer-Distributers; and I do hereby declare that the following is a full, clear, and exact description of the construction and operation of the same, reference being had to the annexed drawings making a part of this specification, and to the letters and figures of reference marked thereon.

Figure 1:
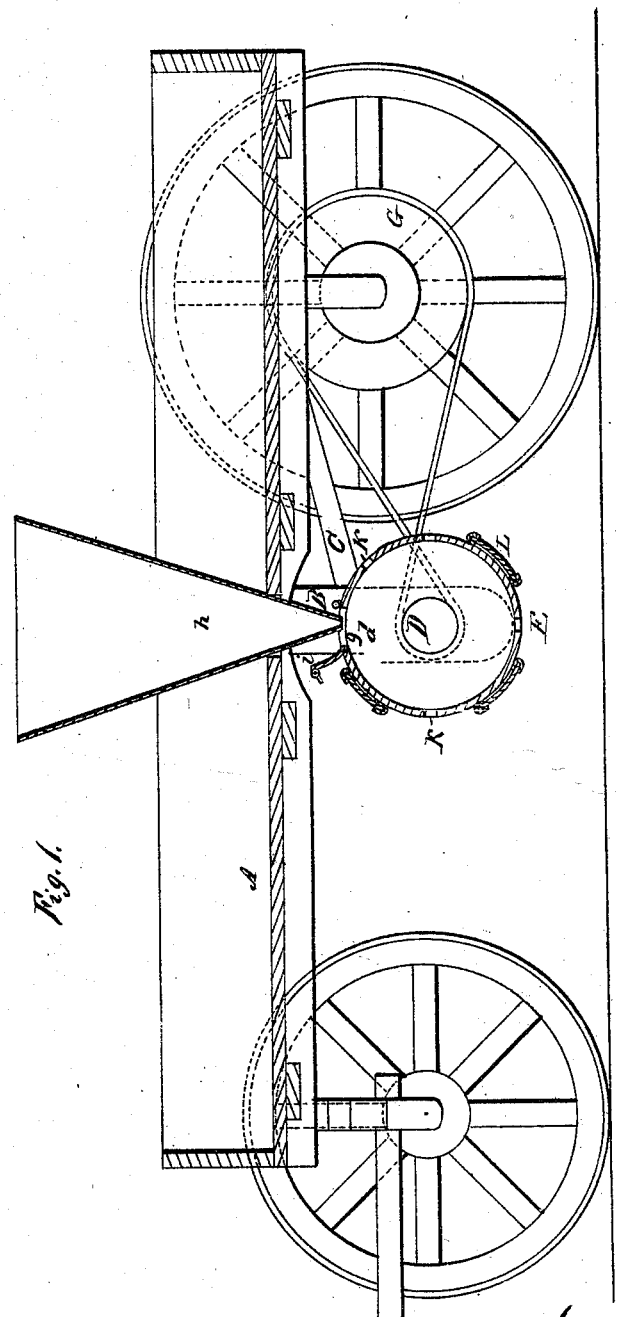
Figure 2:
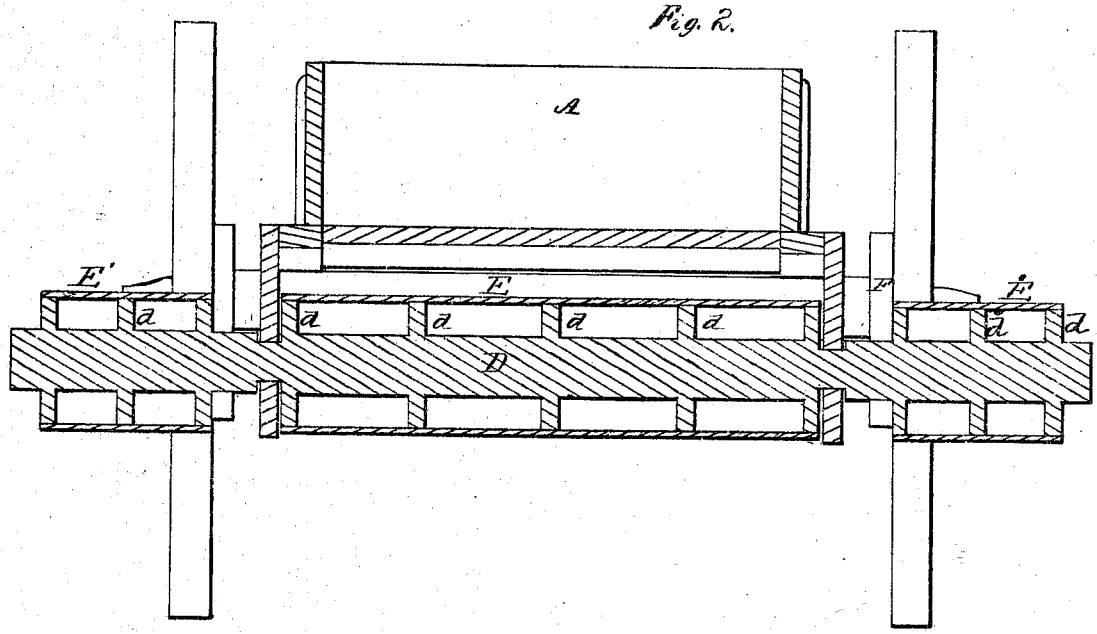

Figure 1 of the drawings, is a representation of a longitudinal vertical section of my fertilizer. Fig. 2 is a cross-section of the same.

My invention has relation to means for distributing plaster, phosphates, and other pulverized fertilizers upon the soil; and it consists in the novel construction of the distributing-cylinders and their arrangement, as attached to an ordinary farm-wagon, as hereinafter more fully described and claimed.

Referring to the drawings, A designates an ordinary four-wheeled farm-wagon, having at the sides the vertical pendent arms B, braced by the rearwardly-extending oblique arms C. D represents a transverse shaft, having its bearings in the pendent arms B, and provided with circular heads $d$, supporting the sections E E E of the distributing-cylinder, the first two lying outside, and the last between the pendent arms B. The cylinder is rotated by means of belts F, connecting the shaft to belt-pulleys G on the hubs of the hind wheels, so that the cylinder moves with the wheels as the wagon is drawn over the ground. The cylinder is filled through openings $g$ in its walls, by means of a hopper or funnel, $h$, which is detachable. The openings $g$ are closed when the cylinder is filled by means of hinged gates $i$, having suitable latches to secure them. For convenience in filling the middle section of the cylinder the wagon-body has a transverse opening above said section, which, when not in use, may be covered by a plank. The supply of plaster is contained in the wagon, and furnished to the cylinder according as required. From the different sections of the cylinder the plaster escapes through openings or slots K, running lengthwise of the cylinder. Slides L are arranged to cover said openings, so as to regulate the quantity of plaster sown, and the number thereof may be increased or decreased at will. When desirable to sow fertilizers with great freedom, all these slides may be removed.

The object in making the cylinder in three sections is to afford the shaft the requisite bearings in the pendent arms B without necessitating a decrease in the length of the cylinder, and also to allow the motion from the large pulleys G to be communicated by belts directly to the shaft, or to smaller pulleys upon the latter, in order to obtain a rapid revolution of the cylinder, and with it the desired centrifugal effect for the proper distribution of the plaster.

What I claim as new, and desire to secure by Letters Patent, is—

In a fertilizer-distributer, the cylinders E E E, constructed in sections and having partitions $d$ and the removable slides L, arranged for attachment to the wagon, as shown and described.

In testimony that I claim the above I have hereunto subscribed my name in the presence of two witnesses.

MATTHIAS WALLS FAUBION.

Witnesses:
H. A. McDONALD,
J. C. LA RUE.